US012652090B2

(12) United States Patent
Zare-Hoseini

(10) Patent No.: US 12,652,090 B2
(45) Date of Patent: Jun. 9, 2026

(54) RF BEAMFORMING TOPOLOGY

(71) Applicant: MEDIATEK Singapore Pte. Ltd., Singapore (SG)

(72) Inventor: Hashem Zare-Hoseini, Cambridge (GB)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 370 days.

(21) Appl. No.: 18/450,897

(22) Filed: Aug. 16, 2023

(65) Prior Publication Data

US 2024/0235632 A1     Jul. 11, 2024

Related U.S. Application Data

(60) Provisional application No. 63/479,000, filed on Jan. 9, 2023.

(51) Int. Cl.
   *H04B 7/06*       (2006.01)
   *H04L 27/26*      (2006.01)
(52) U.S. Cl.
   CPC ....... *H04B 7/0617* (2013.01); *H04L 27/2627* (2013.01)
(58) Field of Classification Search
   CPC .. H04B 7/0617; H04L 27/2627; H04L 27/361
   USPC ....................................................... 375/267
   See application file for complete search history.

(56) References Cited

U.S. PATENT DOCUMENTS

2020/0153476 A1*  5/2020  Burke .................... H03D 7/165
2023/0091253 A1*  3/2023  Wang ..................... H03F 3/211
                                                    330/124 R

OTHER PUBLICATIONS

Ellinger et al., Integrated adjustable phase shifters. IEEE Microwave Magazine. Oct. 2010;11(6):97-108. DOI: 10.1109/MMM. 2010.937730. https://www.researchgate.net/publication/224172763_ Integrated_Adjustable_Phase_Shifters (Last accessed Nov. 8, 2023).

* cited by examiner

*Primary Examiner* — Fitwi Y Hailegiorgis
(74) *Attorney, Agent, or Firm* — McClure, Qualey & Rodack, LLP

(57)         ABSTRACT

Described herein are systems for vector modulated beamforming that may be implemented in a space-efficient manner and with high channel isolation. In some embodiments, systems described herein may perform I/Q vector modulation downstream of receive signal summation and/or upstream of transmit signal division. Implementing I/Q modulation on a transmit signal prior to dividing the transmit signal among multiple transmit channels, and/or on a receive signal after multiple receive channels have been summed to form the receive signal, may use fewer I/Q modulators than channels, such as a single I/Q modulator. Having fewer I/Q modulators than channels results in a space-efficient beamforming architecture having low channel crosstalk and/or permits use of a simple I/Q modulator calibration procedure. Alternatively or additionally, in some embodiments, channel summing and/or dividing circuitry in systems described herein may be coupled between amplification circuitry and I/Q vector modulation circuitry to advantageously use fewer I/Q modulators than channels.

18 Claims, 10 Drawing Sheets

Graph 250

Vector I/Q Mod. 200

Splitter 202

I/Q Mod. 204

0°

90°

Vector Mod. 206

α

β

VGA Q

Combiner 208

αV$_{in}$ jβV$_{in}$

V$_{out}$

V$_{in}$

Subsystem 802a

Subsystem Divide 834

Up Conv. 836

838

Subsystem 802b

System 800

RF BEAMFORMING TOPOLOGY

CROSS-REFERENCE TO RELATED APPLICATIONS

This application claims the benefit under 35 U.S.C. § 119(e) of U.S. Provisional Application No. 63/479,000 filed Jan. 9, 2023, and entitled "RF BEAMFORMING TOPOLOGY," which is hereby incorporated by reference herein in its entirety.

BACKGROUND

Radio-frequency (RF) transmit and/or receive (TX/RX) systems are typically used to condition and modulate signals for wireless transmission and/or to condition and modulate signals received wirelessly. Signal conditioning is usually performed by amplifying the signal before transmission and/or after reception as appropriate. In systems that use an antenna array for transmission and/or reception, modulation applied to transmitted and/or received signals may include beamforming to steer the direction of transmission and/or reception of signals via the antenna array.

Beamforming is typically performed by applying an appropriate time delay to each transmitted RF signal prior to transmission and/or to each received signal following reception. For transmitted signals, a transmit signal to be beamformed may be split into multiple RF signals associated with respective transmit channels (e.g., one channel per antenna) such that time delays are applied to signals in each transmit channel. Inversely, for received signals, time delays may be applied to multiple RF signals associated with respective receive channels (e.g., one channel per antenna) and then the RF signals in each receive channel may be summed to produce a beamformed receive signal. The time delays have the cumulative effect of steering the transmitted signals in a particular direction of focus to form a transmit beam in that direction, and/or steering the direction of reception in a particular direction of focus to form a receive beam in that direction.

Within beamforming, time delays are usually applied to transmitted and/or received signals either as a true time delay (e.g., by adjusting the physical or electrical path length traveled by the signal) or as a phase shift to the signal that is substantially equivalent to such a time delay. Phase shifting may be preferred over true time delay in some applications, such as where adjusting physical or electrical path lengths traveled by signals would be too complex or space-inefficient to implement, and/or where the signals to be transmitted and/or received have too large of bandwidth for a practical implementation of true time delay.

One common technique for phase shift beamforming is in-phase and quadrature (I/Q) vector modulation. I/Q vector modulation typically splits a signal into in-phase and quadrature vector components and manipulates the amplitudes of each component individually before re-combining the components to form the modulated signal. Adjusting the amplitudes of each component of a signal individually and re-combining the components may have the equivalent effect of applying a phase shift to the signal, thereby effecting a time delay.

BRIEF SUMMARY

Some embodiments relate to a radio-frequency (RF) beamforming circuit, comprising amplification circuitry configured to transmit and/or receive RF signals via a plurality of RF antennas, in-phase and quadrature (I/Q) vector modulation circuitry, and channel summing and/or dividing circuitry coupled between the amplification circuitry and at least a portion of the I/Q vector modulation circuitry.

In some embodiments, the amplification circuitry may comprise, for each of the plurality of RF antennas, an amplifier configured to transmit and/or receive an RF signal via the respective RF antenna, each amplifier being associated with a channel that the channel summing and/or dividing circuitry is configured to sum and/or divide.

In some embodiments, the channel summing and/or dividing circuitry may comprise a first summing and/or dividing circuit coupled between each amplifier of the amplification circuitry and an in-phase port of the I/Q vector modulation circuitry and a second summing and/or dividing circuit coupled between each amplifier of the amplification circuitry and a quadrature port of the I/Q vector modulation circuitry.

In some embodiments, the I/Q vector modulation circuitry may comprise an I/Q modulator comprising the in-phase port and the quadrature port, a first plurality of amplitude adjusters coupled between respective amplifiers and the first summing and/or dividing circuit, and a second plurality of amplitude adjusters coupled between the respective amplifiers and the second summing and/or dividing circuit.

In some embodiments, the I/Q vector modulation circuitry may comprise inductive I/Q vector modulation circuitry.

In some embodiments, the amplification circuitry may be configured to transmit RF signals via the plurality of RF antennas, and the channel summing and/or dividing circuitry may comprise channel dividing circuitry coupled between input ports of the amplification circuitry and output ports of the I/Q vector modulation circuitry.

In some embodiments, the channel dividing circuitry may comprise a first channel divider coupled between the input ports of the amplification circuitry and an in-phase output port of the I/Q vector modulation circuitry, and a second channel divider coupled between the input ports of the amplification circuitry and a quadrature output port of the I/Q vector modulation circuitry.

In some embodiments, the RF beamforming circuit may further comprise, for each of the plurality of RF antennas, a combiner having a first input port coupled to an output port of the first channel divider, a second input port coupled to an output port of the second channel divider, and an output port coupled to the RF antenna.

In some embodiments, the amplification circuitry may be configured to receive RF signals via the plurality of RF antennas, and the channel summing and/or dividing circuitry may comprise channel summing circuitry coupled between output ports of the amplification circuitry and input ports of the I/Q vector modulation circuitry.

In some embodiments, the channel summing circuitry may comprise a first channel summer coupled between the output ports of the amplification circuitry and an in-phase input port of the I/Q vector demodulation circuitry, and a second channel summer coupled between the output ports of the amplification circuitry and a quadrature input port of the I/Q vector demodulation circuitry.

In some embodiments, the RF beamforming circuit may further comprise, for each of the plurality of RF antennas, a splitter having an input port coupled to the RF antenna, a first output port coupled to an input port of the first channel summer, and a second output port coupled to an input port of the second channel summer.

Some embodiments relate to a radio-frequency (RF) transmit and/or receive system, comprising a plurality of transmitters and/or receivers configured to communicate via a respective plurality of RF antennas, and beamforming circuitry configured to transition between an RF signal and a plurality of RF signals at the plurality of RF antennas, respectively, the plurality of RF signals being steered with respect to the RF signal, and the beamforming circuitry comprising an in-phase and quadrature (I/Q) modulator configured to process a first component of the RF signal as an in-phase component and a second component of the RF signal as a quadrature component, and circuitry configured to convert between the first component of the RF signal and first components of the plurality of RF signals and between the second component of the RF signal and second components of the plurality of RF signals.

In some embodiments, each of the plurality of transmitters and/or receivers may comprise an amplifier coupled to a respective one of the plurality of antennas.

In some embodiments, the I/Q modulator may comprise an inductive I/Q modulator.

In some embodiments, the I/Q modulator may comprise an in-phase frequency converter configured to process the first component of the RF signal and a quadrature frequency converter configured to process the second component of the RF signal.

In some embodiments, the first components of the plurality of RF signals may correspond to in-phase components of the plurality of RF signals and the second components of the plurality of RF signals may correspond to quadrature components of the plurality of RF signals.

In some embodiments, the beamforming circuitry may further comprise vector modulation circuitry configured to individually adjust amplitudes of the first components of the plurality of RF signals and to individually adjust amplitudes of the second components of the plurality of RF signals.

In some embodiments, the plurality of transmitters and/or receivers may comprise a plurality of transmitters configured to transmit the plurality of RF signals via the plurality of RF antennas, and the circuitry may comprise a first divider circuit configured to split the first component of the RF signal into the first components of the plurality of RF signals and a second divider circuit configured to split the second component of the RF signal into the second components of the plurality of RF signals.

In some embodiments, the beamforming circuitry may further comprise, for each of the plurality of RF signals, a combiner circuit configured to combine the first and second components of the respective RF signal for transmission via a respective one of the plurality of RF antennas.

In some embodiments, the plurality of transmitters and/or receivers may comprise a plurality of receivers configured to obtain the plurality of RF signals via the plurality of RF antennas, the circuitry may comprise a first summing circuit configured to combine the first components of the plurality of RF signals into the first component of the RF signal and a second summing circuit configured to combine the second components of the plurality of RF signals into the second component of the RF signal, and the beamforming circuitry may further comprise, for each of the plurality of RF signals, a splitter circuit configured to obtain and provide the first and second components of the respective RF signal when received via a respective one of the plurality of RF antennas.

The foregoing summary is provided by way of illustration and is not intended to be limiting.

BRIEF DESCRIPTION OF DRAWINGS

In the drawings, each identical or nearly identical component that is illustrated in various figures is represented by a like reference character. For purposes of clarity, not every component may be labeled in every drawing. The drawings are not necessarily drawn to scale, with emphasis instead being placed on illustrating various aspects of the systems and devices described herein.

DETAILED DESCRIPTION

The inventor has recognized several drawbacks of existing RF transmit and/or receive systems that implement vector modulation. For instance, some existing systems include I/Q modulation circuitry coupled between amplification circuitry and channel summing and/or dividing circuitry. However, such a configuration requires an I/Q modulator to be provided for each channel. Since I/Q modulators tend to produce noise, the I/Q modulators of neighboring channels may need to be spaced far apart from one another to minimize crosstalk between the channels (e.g., due to electromagnetic coupling between I/Q modulators), which would otherwise result in degraded channel isolation in some applications. The large space required between I/Q modulators of adjacent channels for such applications results in a large footprint of the overall architecture. Including several I/Q modulators may further require a complex calibration procedure to account for each I/Q modulator. Moreover, where inductive I/Q modulators are used, each individual I/Q modulator may have a large footprint to achieve a desired inductance, resulting in a large footprint of the overall architecture when several modulators are included for several respective channels.

To overcome these drawbacks, the inventors developed improved systems for vector modulated beamforming that may be implemented in a space-efficient manner and with high channel isolation. In some embodiments, systems described herein may perform I/Q vector modulation, at least in part, downstream of receive signal summation and/or upstream of transmit signal division. For example, the inventors recognized that it may be advantageous to implement I/Q modulation on a transmit signal prior to dividing the transmit signal among multiple transmit channels and/or on a receive signal after multiple receive channels have been summed to form the receive signal, as doing so may use fewer I/Q modulators than channels, such as a single I/Q modulator. Having fewer I/Q modulators than channels results in a space-efficient beamforming architecture having low channel crosstalk, and/or permits a simple I/Q modulator calibration procedure to be used. Alternatively or additionally, in some embodiments, channel summing and/or dividing circuitry in systems described herein may be coupled between amplification circuitry and I/Q vector modulation circuitry. For example, such configurations may advantageously use fewer I/Q modulators than channels.

It should be appreciated that aspects described herein may be used alone or in combination.

Figure 1:
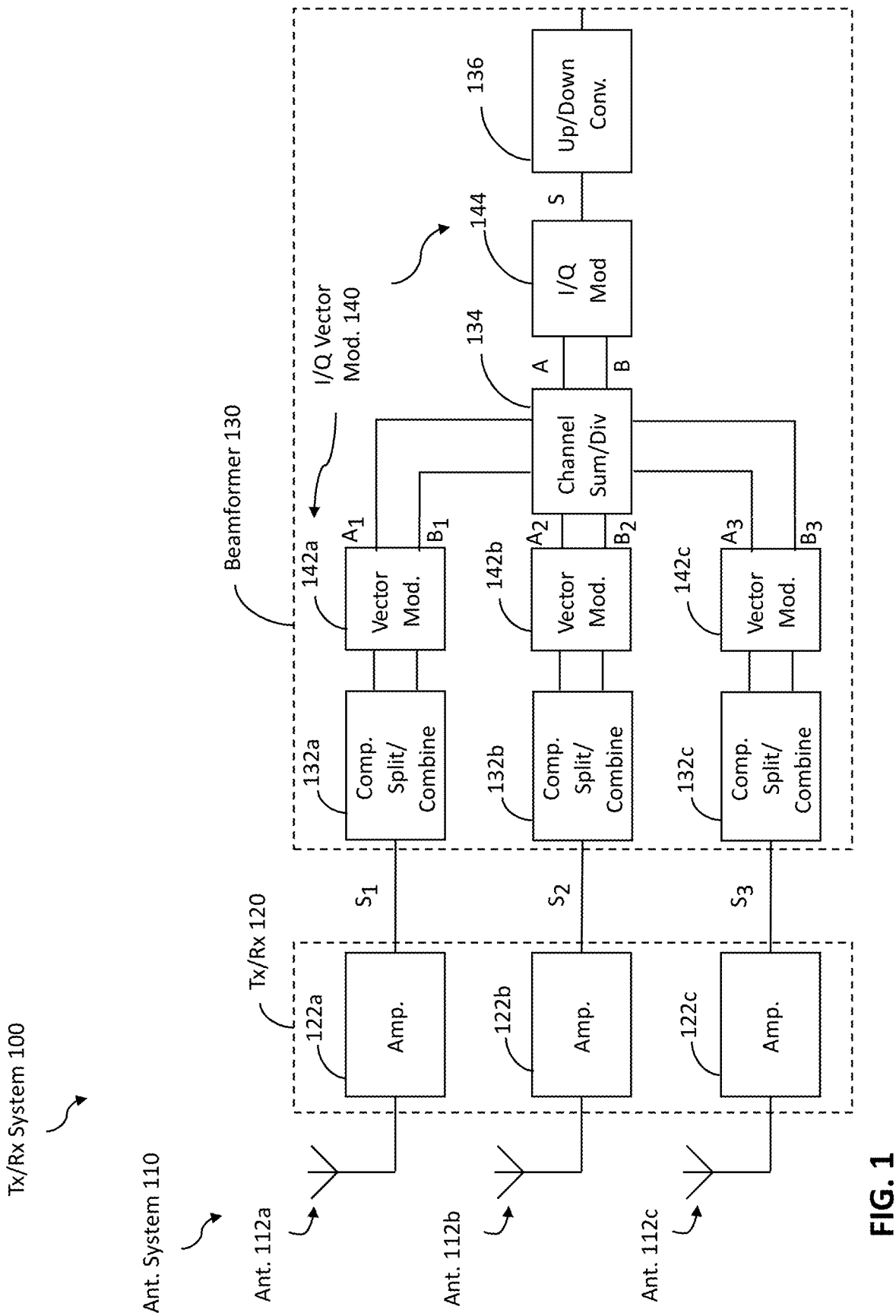
FIG. 1 is a block diagram of an example RF transmit and/or receive system, according to some embodiments.

FIG. 1 is a block diagram of an example RF transmit and/or receive system 100, according to some embodiments. In some embodiments, system 100 may be configured to condition, beamform, and transmit and/or receive RF signals. For example, as shown in FIG. 1, system 100 includes an antenna system 110, transmit and/or receive circuitry 120, and beamformer 130. In some embodiments, antenna system 110 may be configured to transmit and/or receive RF signals, transmit and/or receive circuitry 120 may be configured to condition RF signals received and/or for transmission via antenna system 110, and beamformer 130 may be configured to steer RF signals received and/or transmitted via antenna system 110. In some embodiments, beamformer 130 may be coupled to further processing circuitry operating at baseband and/or at an intermediate frequency (IF) band, such as to obtain a signal to be transmitted at RF and/or to provide a signal received at RF via antenna system 110.

In some embodiments, components of system 100 may be configured to operate at RF. For example, components of system 100 (e.g., antenna system 100 and/or transmit and/or receive circuitry 120) may be configured to operate in at least one frequency band within a range from 5 gigahertz (GHz) to 100 GHz, although other ranges of frequencies may be used. For instance, a single frequency band may be used for transmission and/or reception, and/or multiple frequency bands may be used for transmission and reception, respectively. Examples of frequency bands that may be used include: a frequency band having a center frequency of 10 GHZ, a frequency band having a center frequency of 30 GHZ, a frequency band having a center frequency of 50 GHz, a frequency band having a center frequency of 70 GHZ, a frequency band having a center frequency of 90 GHz, as well as other frequency bands that may be used.

According to various embodiments, system 100 may be implemented together with and/or within a wireless communication system that operates using beamforming. In some embodiments, system 100 may be implemented in a data communication device (e.g., a 5G communication device), such as a mobile device (e.g., mobile phone, portable computer, and/or wearable device), a centralized data communication base station (e.g., a cell tower), and/or a distributed data communication network node (e.g., a decentralized cell network node). Alternatively, in some embodiments, system 100 may be implemented in a radio detection and ranging (RADAR) system and/or a satellite communications (SATCOM) system. It should be appreciated that other implementations of the present aspects are also contemplated.

In some embodiments, components of system 100 may be implemented using integrated circuit technology. For example, transmit and/or receive circuitry 120 and beamformer 130 may include one or more integrated circuits, such as an integrated circuit with transmit and/or receive circuitry 120 therein and an integrated circuit with beamformer 130 therein, and/or a single integrated circuit including each of transmit and/or receive circuitry 120 and beamformer 130. In some embodiments, integrated circuits including transmit and/or receive circuitry 120 and beamformer 130 may be disposed on the same circuit board and interconnected using traces of the circuit board, though in other embodiments they may be formed on different circuit boards connected to one another by an electrical connector. In some embodiments, antenna system 110 may be coupled to transmit and/or receive circuitry 120 by one or more cables (e.g., coaxial cables).

In some embodiments, antenna system 110 may include a plurality of antennas. For example, as shown in FIG. 1, antenna system 110 may include a first antenna 112a, a second antenna 112b, and a third antenna 112c. In some embodiments, first antenna 112a, second antenna 112b, and third antenna 112c may be arranged to form part or all of an antenna array configured for use with beamforming techniques. For example, first antenna 112a, second antenna 112b, and third antenna 112c may be disposed in a row to form a row or column array. In this example, applying a phase shift to signals transmitted and/or received using first antenna 112a, second antenna 112b, and third antenna 112c may result in the transmission and/or reception being steered relative to the row or column direction along which the antennas are disposed. Alternatively or additionally, first antenna 112a, second antenna 112b, and third antenna 112c may be disposed in respective rows or columns of an array. While three antennas are shown for system 100, it should be appreciated that more or fewer antennas may be included.

In some embodiments, transmit and/or receive circuitry 120 may include a plurality of transmitters and/or receivers configured to communicate via respective antennas of antenna system 110. For example, as shown in FIG. 1, transmit and/or receive circuitry 120 includes a first transmitter and/or receiver including amplification circuitry 122b that may be configured to transmit and/or receive RF signals via first antenna 112a, a second transmitter and/or receiver including amplification circuitry 122b that may be configured to transmit and/or receive RF signals via second antenna 112b, and a third transmitter and/or receiver including amplification circuitry 122c that may be configured to transmit and/or receive RF signals via third antenna 112c. In the illustrated embodiment, amplification circuitry 122a, 122b, and 122c are coupled to first antenna 112a, second antenna 112b, and third antenna 112c, respectively.

Figure 3:
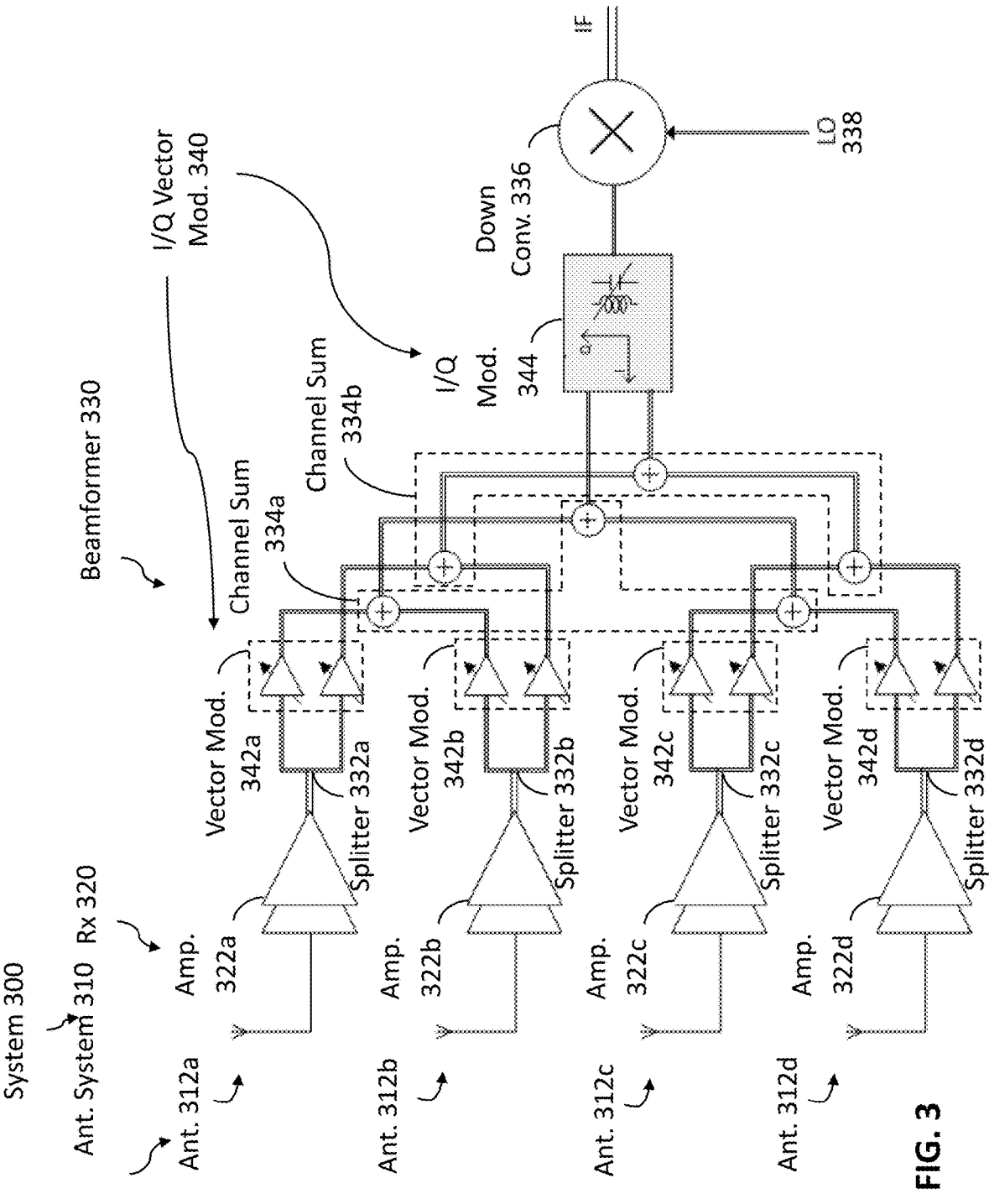
FIG. 3 is a circuit diagram of an example RF receiver system including downstream, inductive I/Q modulation circuitry, according to some embodiments.
Figure 4:
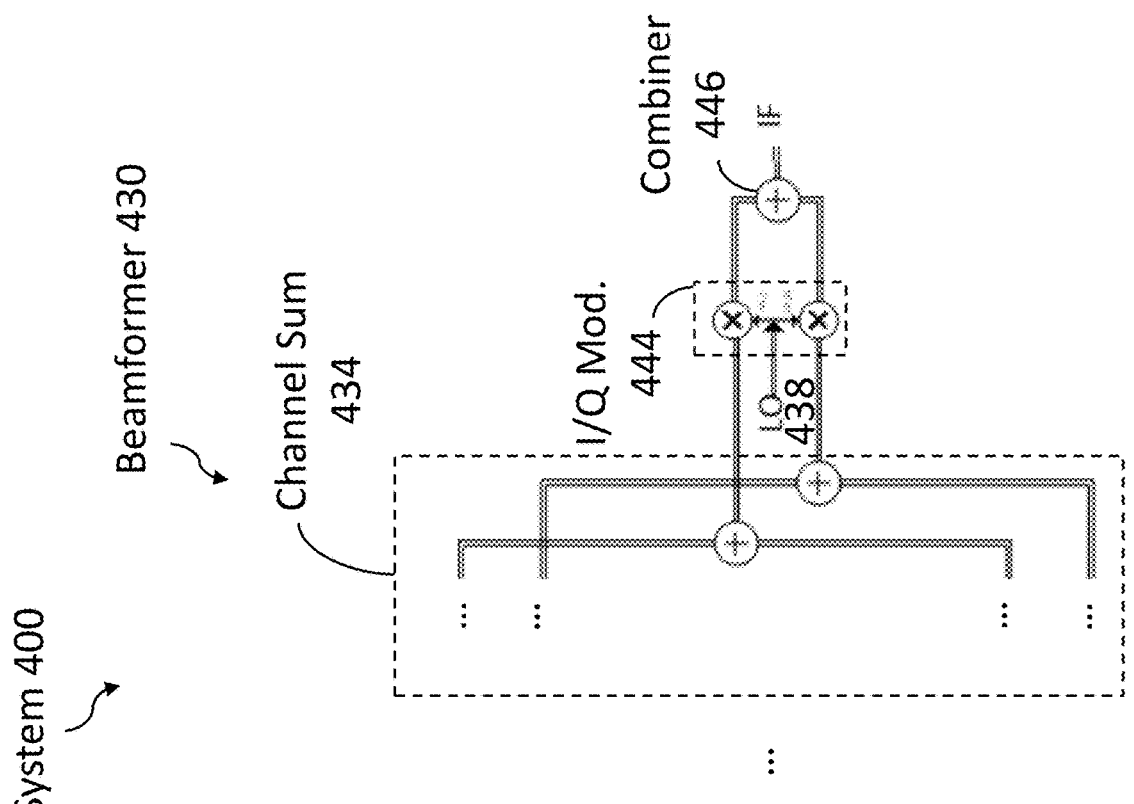
FIG. 4 is a circuit diagram of an example RF receiver system including downstream, oscillator-based I/Q modulation circuitry, according to some embodiments.
Figure 5:
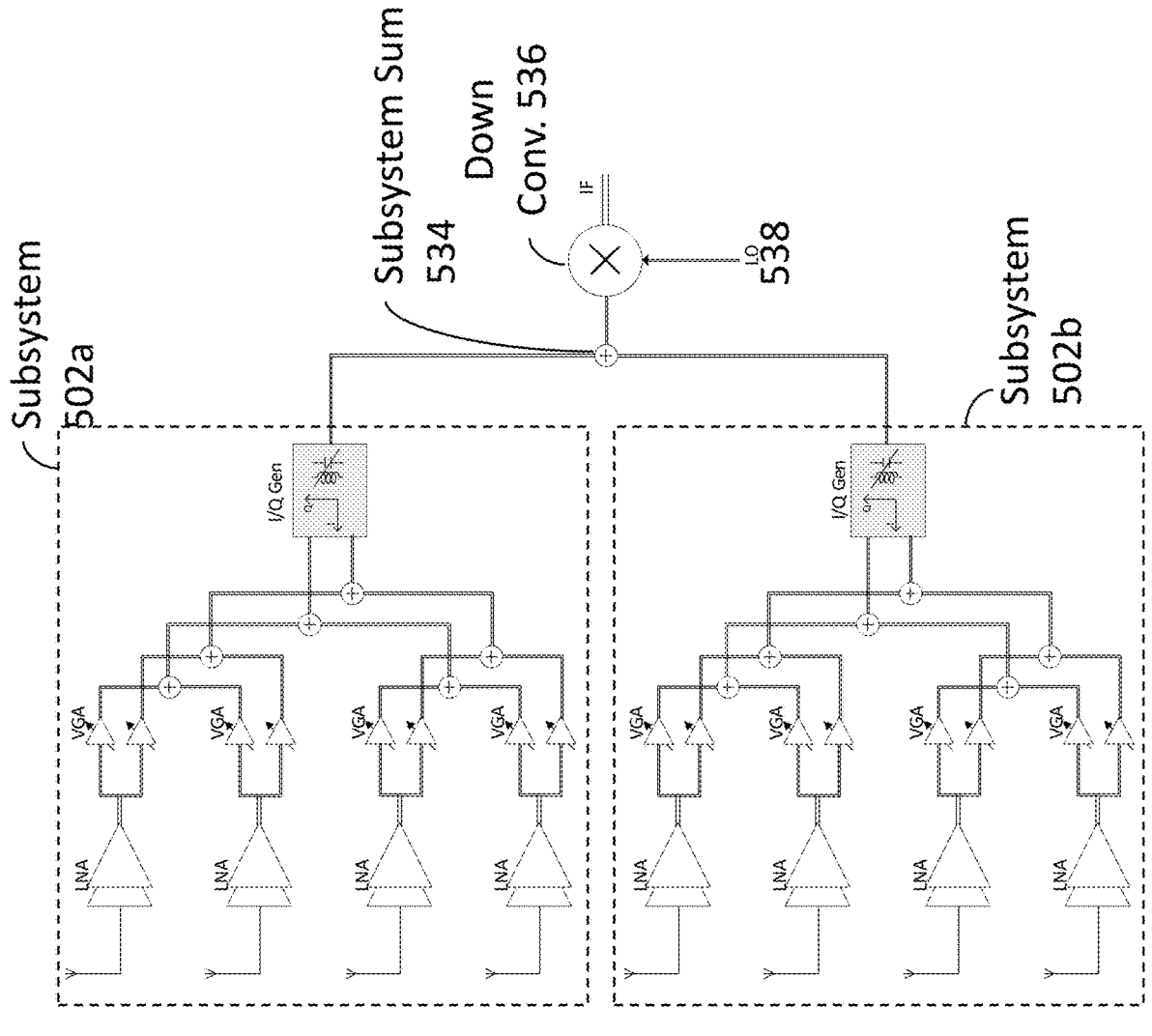
FIG. 5 is a circuit diagram of an example RF receiver system including multiple downstream, inductive I/Q modulation circuits, according to some embodiments.

In some embodiments, system 100 may include and/or be configured as a receiver system, with transmit and/or receive circuitry 120 including receivers, such as described herein in connection with FIGS. 3-5. Alternatively, in some embodiments, system 100 may include and/or be configured as a transmitter system, with transmit and/or receive circuitry 120 including transmitters, such as described herein in connection with FIGS. 6-8. Further alternatively, in some embodiments, system 100 may include and/or be configured as a transceiver system, with transmit and/or receive circuitry 120 including both transmitters and receivers, such as described herein in connection with FIG. 9.

In some embodiments, receive beamformer 130 may be configured to transition between RF signals transmitted and/or received at antenna system 110 and an RF signal from which the RF signals are steered using beamforming. For example, as shown in FIG. 1, receive beamformer 130 is coupled at one end to the transmitters and/or receivers of transmit and/or receive circuitry 120 to obtain received RF signals and/or to provide RF signals for transmission via antenna system 110. Also shown in FIG. 1, receive beamformer 130 may be coupled at its other end to processing circuitry to provide an RF receive signal and/or to obtain an RF transmit to be transmitted via antenna system 110. In some embodiments, each transmitter and/or receiver may be associated with a respective transmit and/or receive channel. For example, amplification circuitry of each transmitter and/or receiver may include an amplifier configured to transmit and/or receive an RF signal via a respective RF antenna and associated with the respective transmit and/or receive channel.

In some embodiments, receive beamformer 130 may be configured to perform a component-wise transition between the RF transmit and/or receive channels and the RF signal transitioned to and/or from the channels. For example, as shown in FIG. 1, receive beamformer 130 includes component splitters and/or combiners 132a, 132b, and 132c for each RF transmit and/or receive channel. In the illustrated embodiment, received RF signals $S_1$, $S_2$, and $S_3$ may be split into multiple components at splitters 132a, 132b, and 132c, and/or transmitted RF signals $S_1$, $S_2$, and $S_3$ may be combined from multiple components at combiners 132a, 132b, and 132c. As described further herein, multiple signal components may be used for I/Q vector modulation.

In some embodiments, receive beamformer 130 may include circuitry configured to transition between an RF signal and multiple RF signals that are steered with respect to the RF signal. For example, as shown in FIG. 1, receive beamformer 130 includes channel summing and/or dividing circuitry 134. In some embodiments, channel summing and/or dividing circuitry 134 may include channel summing circuitry configured to transition multiple RF signals associated with respective RF receive channels into an RF receive signal by summing the RF signals. For example, each RF receive channel may be associated with an antenna of antenna system 110 and a receiver of transmit and/or receive circuitry 120. Alternatively or additionally, in some embodiments, channel summing and/or dividing circuitry may include channel dividing circuitry configured to divide an RF transmit signal into multiple RF signals associated with respective RF transmit channels. For example, each RF transmit channel may be associated with an antenna of antenna system 110 and a transmitter of transmit and/or receive circuitry 120. In the illustrated embodiment, channel summing and/or dividing circuitry 134 is coupled between multiple transmit and/or receive channels supporting respective RF signals $S_1$, $S_2$, and $S_3$, and an RF signal S. For instance, RF signals $S_1$, $S_2$, and $S_3$ may be steered with respect to RF signal using beamforming, as described herein.

In some embodiments, receive beamformer 130 may include I/Q vector modulation circuitry 140 configured to steer multiple RF signals with respect to an RF signal. For example, I/Q vector modulation circuitry 140 may be configured to apply a phase shift to multiple RF signals that forms a beam with respect to the RF signal, thereby performing beamforming in combination with channel summing and/or dividing circuitry 134. In the illustrated embodiment, I/Q vector modulation circuitry 140 includes vector modulation circuitry 142a, 142b, and 142c for each RF transmit and/or receive channel and an I/Q modulator 144.

In some embodiments, vector modulation circuitry 142a, 142b, and 142c may be configured to perform component-wise processing of RF signals in each RF transmit and/or receive channel. For example, as shown in FIG. 1, vector modulation circuitry 142a is coupled to component splitter and/or combiner 132a to receive and/or provide a first signal component $A_1$ and a second signal component $B_1$ of RF signal $S_1$, vector modulation circuitry 142b is coupled to component splitter and/or combiner 132b to receive and/or provide a first signal component $A_2$ and a second signal component $B_2$ of RF signal $S_2$, and vector modulation circuitry 142c is coupled to component splitter and/or combiner 132c to receive and/or provide a first signal component $A_3$ and a second signal component $B_3$ of RF signal $S_3$. In the illustrated embodiment, the first components $A_1$, $A_2$, and $A_3$ may correspond to in-phase components of the respective RF signals $S_1$, $S_2$, and $S_3$, and second components $B_1$, $B_2$, and $B_3$ may correspond to quadrature components of the respective RF signals $S_1$, $S_2$, and $S_3$ (e.g., 90 degrees out of phase from the in-phase components). For example, vector modulation circuitry 142a, 142b, and 142c may be configured to individually adjust amplitudes of first components $A_1$, $A_2$, and $A_3$ and to individually adjust amplitudes of second components $B_1$, $B_2$, and $B_3$ as part of I/Q vector modulation, described further herein in connection with FIGS. 2A-2B.

In some embodiments, I/Q modulator 144 may be configured to perform component-wise processing of RF signal S. For example, as shown in FIG. 1, I/Q modulator 144 may be configured to process first component A of RF signal S as an in-phase component and second component B of RF signal S as a quadrature component. In some embodiments, I/Q modulator 144 may be implemented using an inductive I/Q modulator, such as described herein in connection with FIGS. 3 and 6. Alternatively or additionally, in some embodiments, I/Q modulator 144 may be implemented using a first component (e.g., in-phase) frequency converter and a second component (e.g., quadrature) frequency converter, such as oscillator-based frequency converters described herein in connection with FIGS. 4 and 7.

In some embodiments, channel summing and/or dividing circuitry 134 may be configured to convert between a first component of an RF signal and first components of multiple RF signals, and between a second component of the RF signal and second components of multiple RF signals. For example, as shown in FIG. 1, channel summing and/or dividing circuitry 134 is coupled to vector modulation circuitry 142a, 142b, and 142c to receive and/or provide first components $A_1$, $A_2$, and $A_3$ of RF signals $S_1$, $S_2$, and $S_3$, respectively, as well as second components $B_1$, $B_2$, and $B_3$ of RF signals $S_1$, $S_2$, and $S_3$, respectively. Also shown in FIG. 1, channel summing and/or dividing circuitry 134 is coupled to I/Q modulator 144 to provide and/or receive a first component A and a second component B of the RF signal S. In the illustrated embodiment, channel summing and/or dividing circuitry 134 may be configured to convert first component A from first components $A_1$, $A_2$, and $A_3$ as a sum and/or to convert first components $A_1$, $A_2$, and $A_3$ from first component A as a division. In some embodiments, channel summing and/or dividing circuitry 134 may include, for each channel, a first summing and/or dividing circuit coupled between the amplification circuitry of the channel (e.g., 122a) and a first port (e.g., in-phase port) of I/Q modulator 144 to transition between the first (e.g., in-phase)

component (e.g., $A_1$) in the channel and first component A of the RF signal S, and a second summing and/or dividing circuit coupled between the amplification circuitry of the channel (e.g., 122a) and a second port (e.g., quadrature port) of I/Q modulator 144 to transition between the second (e.g., quadrature) component (e.g., $B_1$) in the channel and second component B of the RF signal S.

In some embodiments, channel summing and/or dividing circuitry 134 may be coupled between amplification circuitry of transmit and/or receive circuitry 120 and at least a portion of I/Q vector modulation circuitry 140. For example, as shown in FIG. 1, channel summing and/or dividing circuitry 134 is coupled between amplification circuitry 122a, 122b, and 122c and I/Q modulator 144 of I/Q vector modulation circuitry 140. The inventors recognized that having channel summing and/or dividing circuitry 134 coupled between at least a portion of I/Q vector modulation circuitry 140 and amplification circuitry of transmit and/or receive circuitry 120 allows for I/Q vector modulation to be performed with fewer I/Q modulators than channels. For example, as shown in FIG. 1, three channels are shown supporting RF signals $S_1$, $S_2$, $S_3$, whereas only a single I/Q modulator 144 is included in beamformer 130. In the illustrated embodiment, channel summing and/or dividing circuitry 134 may be configured to transition between RF signals $S_1$, $S_2$. $S_3$ and RF signal S such that I/Q modulator 144 only processes RF signal S. Accordingly, I/Q modulators are not needed for each channel, such that system 100 may be implemented with a small form factor and a simple I/Q modulator calibration procedure may be used.

Figure 8:
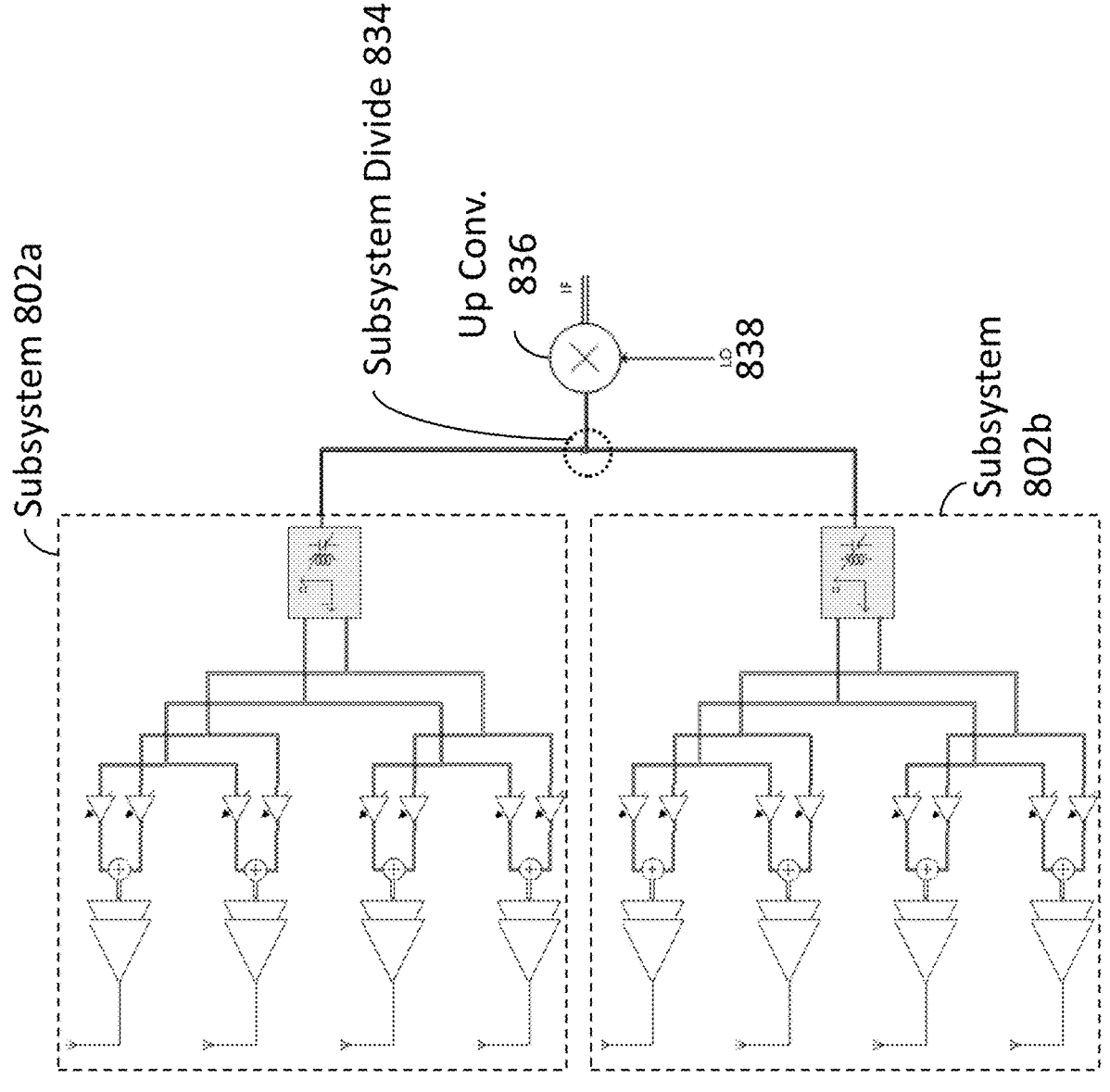
FIG. 8 is a circuit diagram of an example RF transmitter system including multiple upstream, inductive I/Q modulation circuits, according to some embodiments.
Figure 9:
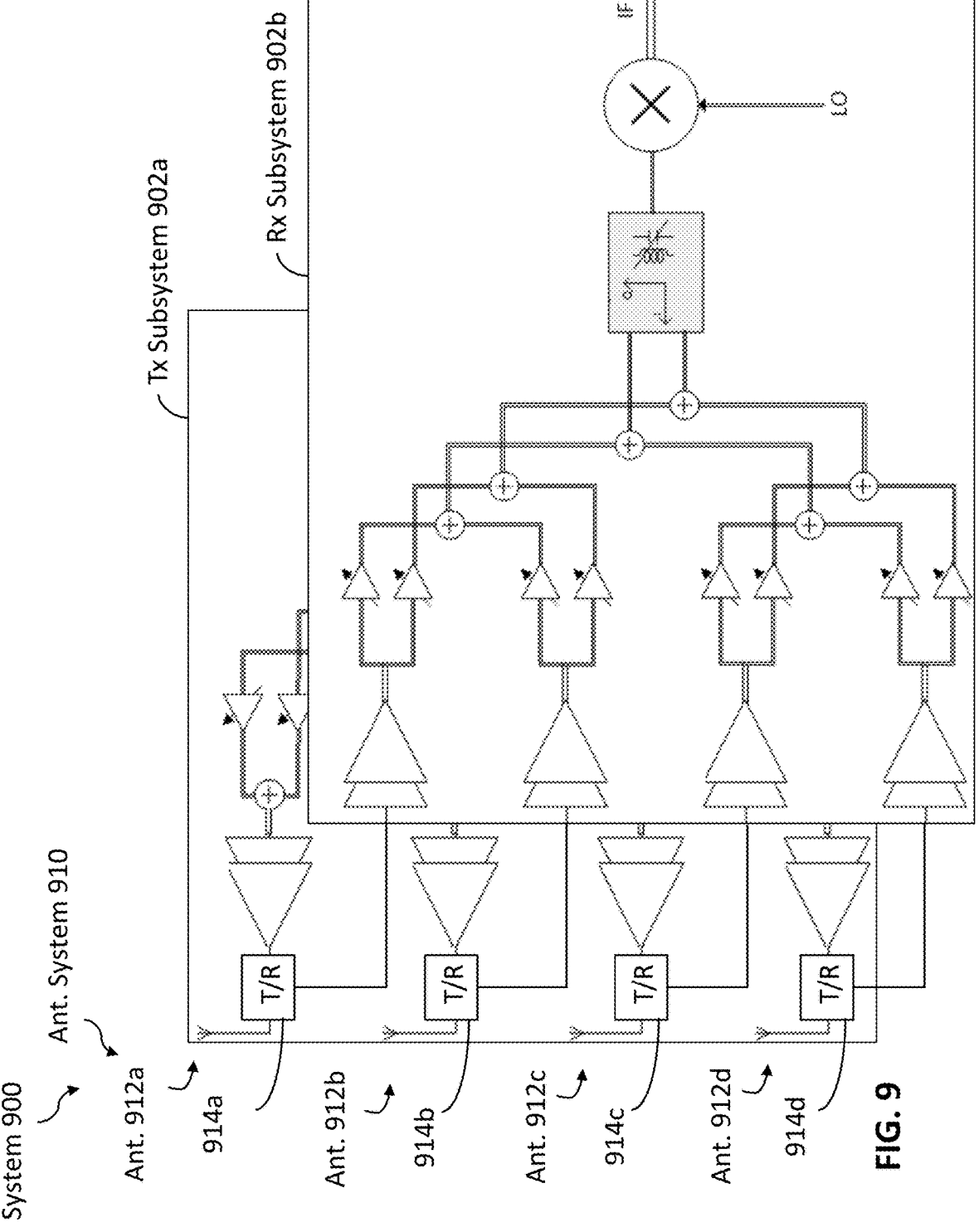
FIG. 9 is a circuit diagram of an example RF transceiver system including upstream, inductive transmitter I/Q modulation circuitry and downstream, inductive receiver I/Q modulation circuitry, according to some embodiments.

While only a single I/Q modulator 144 is shown in FIG. 1, it should be appreciated that more than one I/Q modulator may be used within the scope of the present aspects, such as shown in FIGS. 5 and 8-9.

In some embodiments, beamformer 130 may further include up-conversion and/or down-conversion circuitry 136. For example, up-conversion and/or down-conversion circuitry 136 may be configured to up-convert a transmit signal to RF for beamforming and transmission and/or to down-convert a received RF signal for further processing. According to various embodiments, up-conversion and/or down-conversion circuitry 136 may be configured to up-convert from and/or down-convert to baseband and/or an IF band, depending on the application. It should also be appreciated that some embodiments may omit up-conversion and/or down-conversion circuitry 136, such as where further upstream and/or downstream processing is performed at RF.

Figures 2A, 2B:
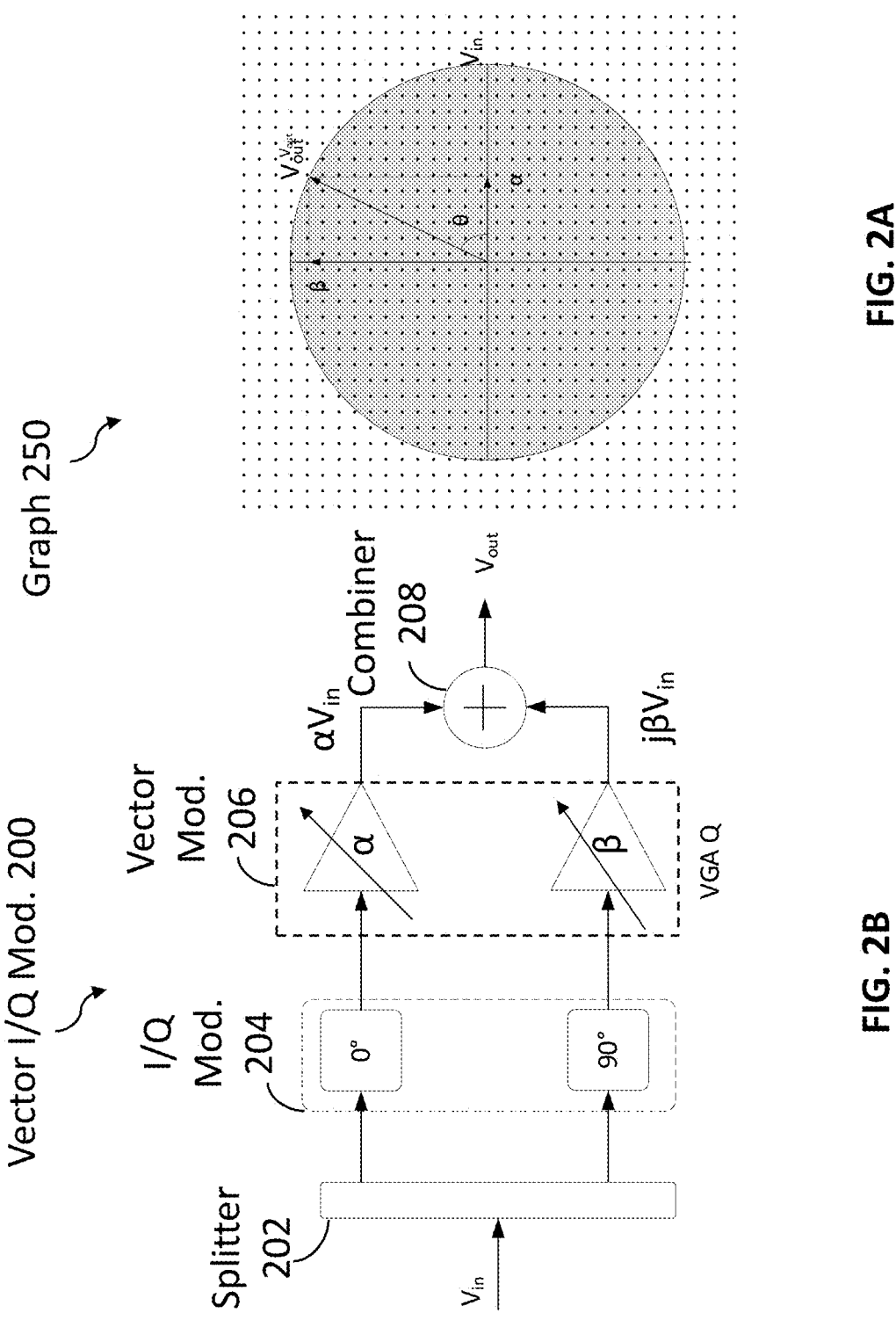
FIG. 2A is a circuit diagram of an example I/Q vector modulation circuit that may be included in the system of FIG. 1, according to some embodiments.
FIG. 2B is a polar graph of an example RF signal that may be modulated using the vector modulation circuit of FIG. 2A, according to some embodiments.

FIG. 2A is a circuit diagram of an example I/Q vector modulation circuit 200 that may be included in system 100, according to some embodiments.

In some embodiments, systems described herein may be configured to perform I/Q vector modulation on an RF signal to add a phase shift to the RF signal. For example, as is known from Euler's formula, $S=e^{j\theta}=A+jB=\cos(\theta)+j\sin(\theta)$, a phase shift $\theta$ may be introduced to an RF signal by splitting an RF signal S into in-phase and quadrature components A and jB and individually adjusting the amplitudes of the components. For example, where an RF signal S' has amplitude 1 and the desired phase shift $\theta$ is 30°, A may be set to $$\frac{\sqrt{3}}{2},$$

and B may be set to ½. In this example, when the individually adjusted components are recombined, the RF signal S' has the complex values $$S' = \frac{\sqrt{3}}{2} + j\frac{1}{2} = \cos(30°) + j\sin(30°).$$

In some embodiments, I/Q vector modulation as described herein may be performed on a received signal, such as to steer a plurality of received signals in a particular direction. Alternatively or additionally, I/Q vector modulation as described herein may be performed on a signal to be transmitted, such as to steer a plurality of transmitted signals in a particular direction.

In some embodiments, I/Q vector modulation circuit 200 may be configured to perform I/Q vector modulation on an RF signal by splitting the RF signal into first and second components, modulating the first and second components into in-phase and quadrature components, individually adjusting amplitudes of the in-phase and quadrature components, and combining the in-phase and quadrature components into an I/Q vector modulated RF signal. For example, as shown in FIG. 2A, I/Q vector modulation circuit 200 includes splitter 202, I/Q modulator 204, vector modulation circuitry 206, and combiner 208.

In some embodiments, splitter 202 may be configured to split an RF signal into first and second components. For example, splitter 202 may include an RF power divider configured to receive a transmission line and split input power from the transmission line substantially equally among two or more output transmission lines. Alternatively, splitter 202 may include a current divider such as including a first conductor connected to multiple conductors that are coupled in parallel with one another. For instance, an RF power divider may be suitable for applications in which voltage signals are propagated along transmission lines, whereas a current divider may be suitable for applications in which current signals are propagated along conductors. It should be appreciated that any suitable splitter may be used in any application within the scope of the present aspects.

In some embodiments, I/Q modulator 204 may be configured to modulate the first and second components from splitter 202 into in-phase and quadrature components. For example, I/Q modulator 204 may include a 90 degree phase shifter coupled to one output of splitter 202, such as where splitter 202 includes a current divider. Alternatively or additionally, in some embodiments, splitter 202 and I/Q modulator 204 may together include a 90 degree hybrid coupler and/or inductive transformer-based coupler (e.g., a passive I/Q generator) configured to receive an RF signal and split the RF signal into a first output and a second output that is 90 degrees out of phase with respect to the second output, such as where voltage signals are propagated along transmission lines. In some embodiments, splitter 202 and I/Q modulator 204 may be configured to operate at in a narrow RF band used for transmission and/or reception by the system, although in other embodiments, wideband RF technologies may be used within the scope of the present aspects.

In some embodiments, vector modulation circuitry 206 may be configured to individually adjust amplitudes of the in-phase and quadrature components from I/Q modulator 204. For example, vector modulation circuitry 206 may include active components such as variable gain amplifiers (VGAs) and/or passive components such as potentiometers.

For instance, VGAs may be suitable for use with voltage signals to apply individual amplitude adjustments to the in-phase and quadrature components, whereas potentiometers may be suitable for use with current signals to produce different voltages at summing and/or transimpedance amplifiers (TIAs) that convert the current signals to voltages. In some embodiments, active and/or passive components of vector modulation circuitry 206 may be configured for digital control. For example, digital control may provide high precision, such as 5 bits of amplitude control (e.g., for 32 possible amplitude levels). It should be appreciated that active and/or passive components may be used as suitable for the application within the scope of the present aspects.

In some embodiments, combiner 208 may be configured to recombine the in-phase and quadrature components from vector modulation circuitry 206 into an I/Q vector modulated RF signal. For example, combined 208 may include a summing amplifier, such as where voltage signals are propagated along transmission lines, and/or a current combiner (e.g., a node at which current from parallel conductors combines to propagate in a single conductor), such as where current signals are propagated along conductors. It should be appreciated that any suitable combiner may be used in any application within the scope of the present aspects.

It should be appreciated that, as used herein, "in-phase" and "quadrature" components of an RF signal may have any phase relationship with respect to the RF signal. For example, an in-phase component of an RF signal may be offset from the RF signal by 45 degrees and a quadrature component of the RF signal may be offset from the RF signal by −45 degrees such that the in-phase and quadrature components are 90 degrees out of phase from one another. Moreover, it should be appreciated that in-phase and quadrature components may not be exactly 90 degrees out of phase with one another, depending on the level of phase noise tolerable by the system.

FIG. 2B is a polar graph of an example RF signal that may be modulated using vector modulation circuit 200, according to some embodiments.

In some embodiments, an RF signal $V_{IN}$ may be modulated into an output $V_{OUT}$ with an in-phase component of amplitude $\alpha$ and a quadrature component of amplitude $\beta$. For example, as shown in FIG. 2B, $V_{IN}$ may be plotted at the origin of the polar graph and $V_{IN}$ may be plotted at coordinates $(\alpha, \beta)$. In some embodiments, the in-phase and quadrature components of the RF signal $V_{IN}$ may be obtained by splitting the RF signal $V_{IN}$ (e.g., using splitter 202) and applying in-phase and quadrature modulation (e.g., using I/Q modulator 204). In this example, the amplitudes $\alpha$ and $\beta$ may be set via individual adjustment of the in-phase and quadrature components (e.g., using vector modulation circuitry 206), and the output $V_{OUT}$ may be generated by combining the components (e.g., using combiner 208).

While vector modulation circuitry 206 is shown downstream of I/Q modulator 204 in FIG. 2A, the inventors have recognized that the vector and I/Q modulation steps of I/Q vector modulation may be applied in any order. Some embodiments leverage this recognition by positioning I/Q modulation components downstream of channel summing components and/or upstream of channel division components to facilitate using fewer I/Q modulators as described herein while still achieving I/Q vector modulation.

FIG. 3 is a circuit diagram of an example RF receiver system 300 including downstream, inductive I/Q modulation circuitry, according to some embodiments. In some embodiments, system 300 may be configured in the manner described herein for system 100. For example, as shown in FIG. 3, system 300 includes antenna system 310, receive circuit 320, and beamformer 330.

In some embodiments, antenna system 310 may be configured in the manner described herein for antenna system 110. For example, as shown in FIG. 3, antenna system 310 includes antennas 312a, 312b, 312c, and 312d, which may be configured in the manner described herein for antennas 112a, 112b, and 112c of antenna system 110.

In some embodiments, receive circuit 320 may be configured in the manner described herein for transmit and/or receive circuit 120. For example, as shown in FIG. 3, receive circuit 320 includes receivers having respective amplification circuitry 322a, 322b, 322c, and 322d. In the illustrated embodiment, the amplification circuitry of each receiver is coupled to a respective one of antennas 312a, 312b, 312c, and 312d to obtain an RF signal therefrom. In the illustrated embodiment, each amplification circuitry 322a, 322b, 322c, and 322d may include a low noise amplifier configured to receive RF signals via antennas 312a, 312b, 312c, and 312d, respectively.

In some embodiments, beamformer 330 may be configured in the manner described herein for beamformer 130. For example, as shown in FIG. 3, beamformer 330 may be configured to transition RF signals from receive channels, corresponding to respective antennas 312a, 312b, 312c, and 312d and/or receivers of system 300, into an RF receive signal with respect to which the RF signals are steered using I/Q vector modulation. As shown in FIG. 3, beamformer 330 includes splitters 332a. 332b, 332c, and 332d coupled to amplification circuitry 332a, 332b, 332c, and 332d, respectively. In the illustrated embodiment, splitters 332a, 332b, 332c, and 332d may have inputs coupled to respective antennas 312a, 312b, 312c, and 312d via output ports of amplification circuitry 322a, 322b, 322c, and 322d to obtain, for each receive channel, a first component and a second component of an RF signal (e.g., corresponding to in-phase and quadrature components) when received via the respective antenna 312a, 312b, 312c, and 312d.

In some embodiments, beamformer 330 may be configured to perform I/Q vector modulation, such as described herein in connection with FIGS. 2A-2B. For example, as shown in FIG. 3, beamformer 330 includes I/Q vector modulation circuitry 340, which may be configured in the manner described herein for I/Q vector modulation circuitry 140. In the illustrated embodiment, I/Q vector modulation circuitry 340 includes vector modulation circuits 342a, 342b, 342c, and 342d coupled to splitters 332a, 332b, 332c, and 332d to receive individual components of the RF signals of each receive channel. In some embodiments, each vector modulation circuit 332a, 332b, 332c, and 332d may be configured to individually adjust amplitudes of components of the RF signals of each receive channel in the manner described herein for vector modulation circuitry 206. Also shown in FIG. 3, I/Q vector modulation circuitry 340 further includes I/Q modulator 344, which may be configured in the manner described herein for I/Q modulator 204. In the illustrated embodiment, I/Q modulator 344 may be and/or include an inductive I/Q modulator.

In some embodiments, beamformer 330 may be configured to perform a component-wise sum of RF signals from each receive channel to transition the RF signals into an RF receive signal. For example, as shown in FIG. 3, beamformer 330 includes channel summing circuitry 334a and 334b, which may be configured to combine first (e.g., in-phase) components of RF signals of each receive channel into a first component of an RF receive signal and to combine second components of the RF signals of each receive channel into a second component of the RF receive signal. In the illustrated embodiment, channel summing circuitry 334a and 334b may include summing amplifiers (e.g., where RF signals are propagated as voltage signals) and/or current combiners (e.g., where RF signals are propagated as current signals).

In some embodiments, channel summing circuitry 334a and 334b may be coupled between respective amplification circuitry 322a, 322b, 322c, and 322d and ports of I/Q vector modulation circuitry 340 to perform a sum of components split by splitters 332a, 332b, 332c, and 332d. For example, as shown in FIG. 3, channel summing circuitry 334a is are coupled between output ports of each amplification circuitry 322a, 322b, 322c, and 322d and an in-phase port of I/Q modulator 344, and channel summing circuitry 334b is coupled between output ports of each amplification circuitry 322a, 322b, 322c, and 322d and a quadrature port of I/Q modulator 344. In the illustrated embodiment, input ports of channel summing circuitry 334a may be coupled to first output ports of splitters 332a, 332b, 332c, and 332d, and input ports of channel summing circuitry 334b may be coupled to second output ports of splitters 332a, 332b, 332c, and 332d.

In some embodiments, channel summing circuitry 334a and 334b may be configured to sum first or second components of multiple received RF signals from respective receive channels into first or second components of a group of receive channels. For example, as shown in FIG. 3, channel summing circuitry 334a is coupled to splitters 332a and 332b, and channel summing circuitry 334b is also coupled to splitters 334a and 334b, which may correspond to first and second channels. In the illustrated embodiment, channel summing circuitry 334a may be configured to sum first components of RF signals split by splitters 332a and 332b into a first component of the first and second channels combined, and channel summing circuitry 334b may be configured to sum second components of RF signals split by splitters 332a and 332b into a second component of the first and second channels combined. Likewise, as shown in FIG. 3, channel summing circuitry 334a and 334b may be configured similarly with respect to splitters 332c and 332d for third and fourth channels.

In some embodiments, channel summing circuitry 334a and 334b may be further configured to perform component sums of RF signals output by channel summers 334a, 334b, 334c, and 334d. For example, as shown in FIG. 3, channel summing circuitry 334a is shown coupled to splitters 332a, 332b, 332c, and 332d to sum together their outputs, such that the output of channel summing circuitry 334a provides a sum of first components from RF signals of each receive channel. Likewise, as shown in FIG. 3, channel summing circuitry 334b is shown coupled to splitters 332a, 332b, 332c, and 332d to sum together their outputs, such that the output of channel summing circuitry 334b provides a sum of second components from RF signals of each receive channel. While channel summing circuitry 334a and 334b is shown in FIG. 3 performing component sums of RF signals from pairs of receive channels joined by respective summers, other configurations are possible, such as performing component sums for all RF signals from each receive channel summed together at a pair of summers (e.g., one summer per signal component), within the scope of the present aspects.

In some embodiments, I/Q vector modulation circuitry 340 may include amplitude adjusters coupled between each amplification circuitry 322a. 322b, 322c, and 332d and channel summing circuitry 334a and 334b. For example, as shown in FIG. 3, vector modulation circuit 342a has a first amplitude adjuster (e.g., VGA) coupled between amplification circuitry 322a and channel summing circuitry 334a and a second amplitude adjuster coupled between amplification circuitry 322a and channel summing circuitry 334b. In the illustrated embodiment, vector modulation circuits 342a, 342b, 342c, and 342d include first amplitude adjusters coupled between each amplification circuitry 322a, 322b, 322c, and 322d and channel summing circuitry 334a (e.g., for in-phase component adjustment), and second amplitude adjusters coupled between each amplification circuitry 322a. 322b, 322c, and 322d and channel summing circuitry 334b (e.g., for quadrature component adjustment).

Also shown in FIG. 3, beamformer 330 includes down-conversion circuitry 336, which may be configured to down-convert an RF receive signal summed by channel summing circuitry 334a and 334b. In the illustrated embodiment, down-conversion circuitry 336 includes a mixer configured to receive a local oscillator (LO) signal 338 at a frequency that converts the RF receive signal to an IF band, although other embodiments may be configured to output a signal at baseband within the scope of the present aspects.

FIG. 4 is a circuit diagram of an example RF receiver system 400 including downstream, oscillator-based I/Q modulation circuitry, according to some embodiments. In some embodiments, system 400 may be configured in the manner described herein for system 300. For example, as shown in FIG. 4, system 400 includes beamformer 430, which may be configured in the manner described herein for beamformer 330. In the illustrated embodiment, beam-former 430 includes channel summing circuitry 434, which may be configured in the manner described herein for channel summing circuitry 334a and 334b. Other portions of system 400 are not shown for simplicity, but may be otherwise configured as described herein for system 300.

Also shown in FIG. 4, beamformer 430 includes I/Q modulator 444 configured to receive an LO signal 438. For instance, I/Q modulator 444 may be oscillator-based. In some embodiments, I/Q modulator 444 may include multiple frequency converters configured to receive LO signal 438, such as a first, in-phase frequency converter and a second, quadrature frequency converter, and a combiner 446 configured (e.g., as described herein for combiner 208) to combine the resulting component parts following in-phase and quadrature frequency conversion (e.g., in an IF band). In some embodiments, an oscillator-based I/Q modulator may advantageously provide both I/Q modulation and down-conversion in applications where an LO signal 438 is available. Moreover, performing I/Q modulation down-stream from receive channel summation, such as described herein may advantageously use fewer oscillator-based I/Q modulators than channels.

FIG. 5 is a circuit diagram of an example RF receiver system 500 including multiple downstream, inductive I/Q modulation circuits, according to some embodiments. In some embodiments, system 500 may include multiple sub-systems, each configured in the manner described herein for system 300. For example, as shown in FIG. 5, system 500 includes a first subsystem 502a and a second subsystem 502b, each of which may include an antenna system (e.g., 310), receiver circuit (e.g., 320), and beamformer (e.g., 330) including I/Q vector modulation circuitry (e.g., 340). In the illustrated embodiment, first and second subsystems 502a and 502b may be located in different physical locations, such as far enough away from one another that propagating RF signals from both subsystems 502a and 502b is challenging (e.g., due to parasitic impedances and/or attenuation) in the particular application.

In some embodiments, system 500 may include subsystem summing circuitry 534 coupled between each subsystem 502a and 502b and down-conversion circuitry 536. For example, subsystem summing circuitry 534 may be configured to combine RF receive signals from subsystems 502a and 502b prior to down-converting to an IF band using LO signal 538, although conversion to baseband is also possible within the scope of the present aspects. Moreover, while inductive I/Q modulators are shown for subsystems 502a and 502b, it should be appreciated that oscillator-based I/Q modulators may be used. For instance, in such embodiments, subsystem summing circuitry may be configured to sum down-converted outputs from the oscillator-based I/Q modulators, and subsequent down-conversion may be omitted.

Figure 6:
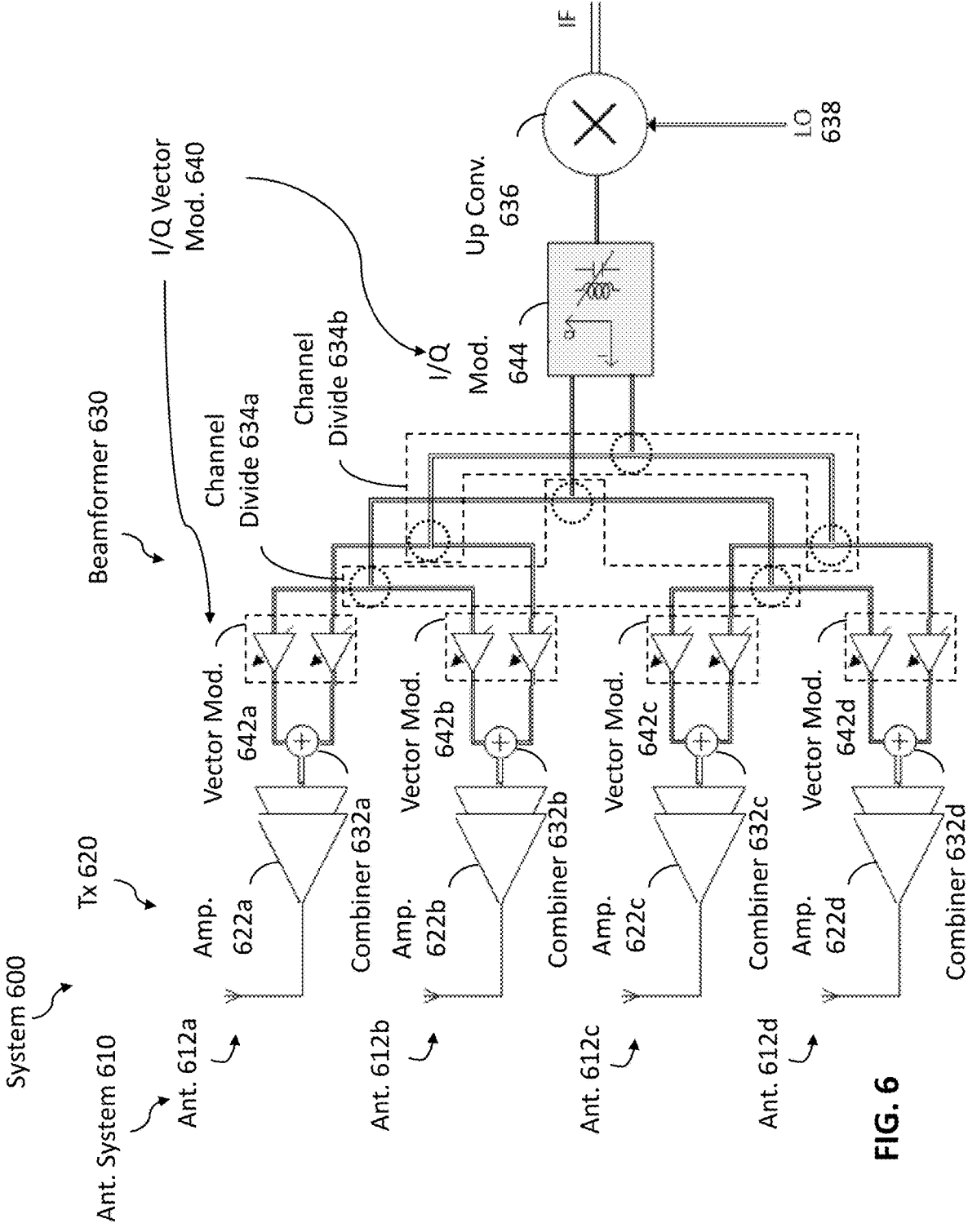
FIG. 6 is a circuit diagram of an example RF transmitter system including upstream, inductive I/Q modulation circuitry, according to some embodiments.

FIG. 6 is a circuit diagram of an example RF transmitter system 600 including upstream, inductive I/Q modulation circuitry, according to some embodiments. In some embodiments, system 600 may be configured in the manner described herein for system 100. For example, as shown in FIG. 6, system 600 includes antenna system 610, transmit circuit 620, and beamformer 630.

In some embodiments, antenna system 610 may be configured in the manner described herein for antenna system 110. For example, as shown in FIG. 6, antenna system 610 includes antennas 612a, 612b, 612c, and 612d, which may be configured in the manner described herein for antennas 112a, 112b, and 112c of antenna system 110.

In some embodiments, transmit circuit 620 may be configured in the manner described herein for transmit and/or receive circuit 120. For example, as shown in FIG. 6, transmit circuit 620 includes transmitters having respective amplification circuitry 622a, 622b, 622c, and 622d. In the illustrated embodiment, the amplification circuitry of each transmitter is coupled to a respective one of antennas 612a, 612b, 612c, and 612d to provide an RF signal thereto. In the illustrated embodiment, each amplification circuitry 622a, 622b, 622c, and 622d may include a power amplifier configured to transmit RF signals via antennas 612a, 612b, 612c, and 612d, respectively.

In some embodiments, beamformer 630 may be configured in the manner described herein for beamformer 130. For example, as shown in FIG. 6, beamformer 630 may be configured to transition an RF transmit signal into RF signals for multiple transmit channels, corresponding to respective antennas 612a, 612b, 612c, and 612d and/or transmitters of system 600, that are steered with respect to the RF transmit signal using I/Q vector modulation. As shown in FIG. 6, beamformer 630 includes combiners 632a, 632b, 632c, and 632d coupled to amplification circuitry 632a, 632b, 632c, and 632d, respectively. In the illustrated embodiment, combiners 632a, 632b, 632c, and 632d may have outputs coupled to respective antennas 612a, 612b, 612c, and 612d via input ports of amplification circuitry 622a, 622b, 622c, and 622d to provide, for each transmit channel, an RF signal from a first component and a second component (e.g., corresponding to in-phase and quadrature components) for transmission via the respective antenna 612a. 612b, 612c, and 612d.

In some embodiments, beamformer 630 may be configured to perform I/Q vector modulation, such as described herein in connection with FIGS. 2A-2B. For example, as shown in FIG. 6, beamformer 630 includes I/Q vector modulation circuitry 640, which may be configured in the manner described herein for I/Q vector modulation circuitry 140. In the illustrated embodiment, I/Q vector modulation circuitry 640 includes vector modulation circuits 642a, 642b, 642c, and 642d coupled to combiners, 632a, 632b, 632c, and 632d to provide individual components of the RF signals of each transmit channel. In some embodiments, each vector modulation circuit 632a, 632b, 632c, and 632d may be configured to individually adjust amplitudes of components of the RF signals of each transmit channel in the manner described herein for vector modulation circuitry 206. Also shown in FIG. 6, I/Q vector modulation circuitry 640 further includes I/Q modulator 644, which may be configured in the manner described herein for I/Q modulator 204. In the illustrated embodiment, I/Q modulator 644 may be and/or include an inductive I/Q modulator.

In some embodiments, beamformer 630 may be configured to perform a component-wise division of RF signals into each transmit channel to transition the RF signals from an RF transmit signal. For example, as shown in FIG. 6, beamformer 630 includes channel dividing circuitry 634a and 634b, which may be configured to split first (e.g., in-phase) components of RF signals of each transmit channel from a first component of an RF transmit signal and to split second components of the RF signals of each transmit channel from a second component of the RF transmit signal. In the illustrated embodiment, channel dividers 634a and 634b may include power dividers (e.g., where RF signals are propagated as voltage signals) and/or current dividers (e.g., where RF signals are propagated as current signals).

In some embodiments, channel dividing circuitry 634a and 634b may be coupled between respective amplification circuitry 622a, 622b, 622c, and 622d and ports of I/Q vector modulation circuitry 640 to perform a division of components to be combined by combiners 632a, 632b, 632c, and 632d within each transmit channel. For example, as shown in FIG. 6, channel dividing circuitry 634a is coupled between input ports of each amplification circuitry 622a, 622b, 622c, and 622d and an in-phase port of I/Q modulator 644, and channel dividing circuitry 634b is coupled between input ports of each amplification circuitry 622a, 622b, 622c, and 622d and a quadrature port of I/Q modulator 644. In the illustrated embodiment, output ports of channel dividing circuitry 634a may be coupled to first input ports of combiners 632a, 632b, 632c, and 632d, and output ports of channel dividing circuitry 634b may be coupled to second input ports of combiners 632a, 632b, 632c, and 632d.

In some embodiments, channel dividing circuitry 634a and 634b may be further configured to perform component division from an RF transmit signal into RF signals to be input to combiners 632a, 632b, 632c, and 632d for all transmit channels. For example, as shown in FIG. 6, channel dividing circuitry 634a is shown coupled to combiners 632a and 632b to divide a first component of an RF transmit signal into first components of RF signals for first and second transmit channels. Likewise, as shown in FIG. 6, channel dividing circuitry 634b is shown coupled to combiners 632a and 632b to divide a second component of the RF transmit signal into second components of RF signals for the first and second transmit channels.

In some embodiments, channel dividing circuitry 634a and 634b may be configured to divide a first or second component of an RF transmit signal into multiple transmit channels. For example, as shown in FIG. 6, channel dividing circuitry 634a is coupled to combiners 632a and 632b, and channel divider circuitry 634b is also coupled to combiners 634a and 634b, which may correspond to first and second transmit channels, respectively. In the illustrated embodiment, channel dividing circuitry 634a may be configured to divide a first component of an RF transmit signal into first components of RF signals of the first and second channels to be combined with corresponding second components of the RF signals by combiners 632a and 632b, and channel dividing circuitry 634b may be configured to divide a second component of an RF transmit signal into second components of RF signals of the first and second channels to be combined with the first components by combiners 632a and 632b. Likewise, as shown in FIG. 6, channel dividing circuitry 634a and 634b may be configured similarly with respect to combiners 632c and 632d for third and fourth channels.

While channel dividing circuitry 634a and 634b is shown in FIG. 6 performing component division of RF signals into pairs of transmit channels joined by respective dividers, other configurations are possible, such as performing component division for all RF signals into each transmit channel at a pair of dividers (e.g., one divider per signal component), within the scope of the present aspects.

In some embodiments, I/Q vector modulation circuitry 640 may include amplitude adjusters coupled between each amplification circuitry 622a, 622b, 622c, and 632d and channel dividing circuitry 634a and 634b. For example, as shown in FIG. 6, vector modulation circuit 642a has a first amplitude adjuster (e.g., VGA) coupled between amplification circuitry 622a and channel dividing circuitry 634a and a second amplitude adjuster coupled between amplification circuitry 622a and channel summing circuitry 634b. In the illustrated embodiment, vector modulation circuits 642a, 642b, 642c, and 642d include first amplitude adjusters coupled between each amplification circuitry 622a, 622b, 622c, and 622d and channel dividing circuitry 634a (e.g., for in-phase component adjustment), and second amplitude adjusters coupled between each amplification circuitry 622a, 622b, 622c, and 622d and channel dividing circuitry 634b (e.g., for quadrature component adjustment).

Also shown in FIG. 6, beamformer 630 includes up-conversion circuitry 636, which may be configured to up-convert a transmit signal to RF for division by channel dividing circuitry 634a and 634b. In the illustrated embodiment, up-conversion circuitry 636 includes a mixer configured to receive an LO signal 638 at a frequency that converts the transmit signal from an IF band to RF, although other embodiments may be configured to up-convert a signal from baseband within the scope of the present aspects.

Figure 7:
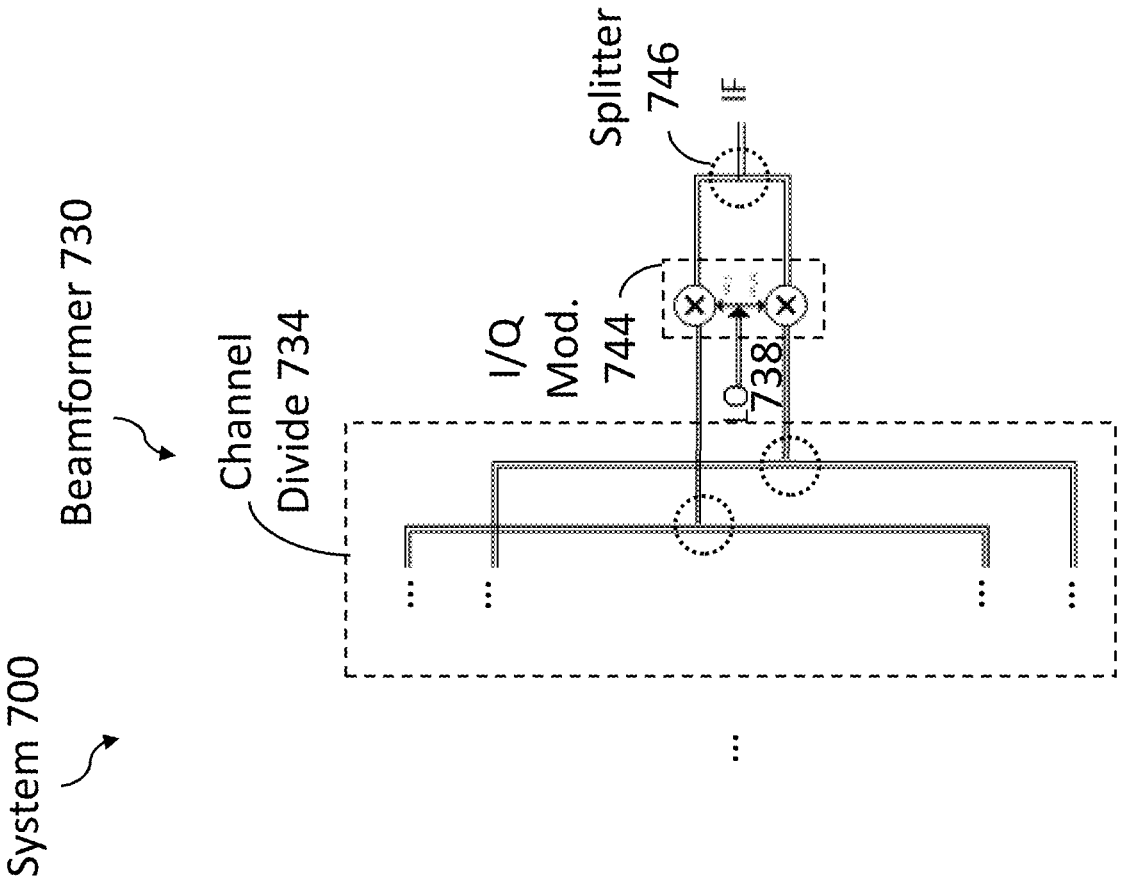
FIG. 7 is a circuit diagram of an example RF transmitter system including upstream, oscillator-based I/Q modulation circuitry, according to some embodiments.

FIG. 7 is a circuit diagram of an example RF transmitter system 700 including upstream, oscillator-based I/Q modulation circuitry, according to some embodiments. In some embodiments, system 700 may be configured in the manner described herein for system 600. For example, as shown in FIG. 7, system 700 includes beamformer 730, which may be configured in the manner described herein for beamformer 630. In the illustrated embodiment, beamformer 730 includes channel dividing circuitry 734, which may be configured in the manner described herein for channel dividing circuitry 634. Other portions of system 700 are not shown for simplicity, but may be otherwise configured as described herein for system 600.

Also shown in FIG. 7, beamformer 730 includes I/Q modulator 744 configured to receive an LO signal 738. For instance, I/Q modulator 744 may be oscillator-based. In some embodiments, I/Q modulator 744 may include multiple frequency converters configured to receive LO signal 738, such as a first, in-phase frequency converter and a second, quadrature frequency converter, and a splitter 746 configured (e.g., as described herein for splitter 202) to split an input signal (e.g., in an IF band) into component parts for in-phase and quadrature frequency conversion. In some embodiments, an oscillator-based I/Q modulator may advantageously provide both I/Q modulation and up-conversion in applications where an LO signal 738 is available. Moreover, performing I/Q modulation upstream of transmit channel division, such as described herein may advantageously use fewer oscillator-based I/Q modulators than channels.

FIG. 8 is a circuit diagram of an example RF transmitter system 800 including multiple upstream, inductive I/Q modulation circuits, according to some embodiments. In some embodiments, system 800 may include multiple subsystems, each configured in the manner described herein for system 600. For example, as shown in FIG. 8, system 800 includes a first subsystem 802a and a second subsystem 802b, each of which may include an antenna system (e.g., 610), transmit circuit (e.g., 620), and beamformer (e.g., 630) including I/Q vector modulation circuitry (e.g., 640). In the illustrated embodiment, first and second subsystems 802a and 802b may be located in different physical locations, such as far enough away from one another that propagating RF signals to both subsystems 802a and 802b is challenging (e.g., due to parasitic impedances and/or attenuation) in the particular application.

In some embodiments, system 800 may include subsystem dividing circuitry 834 coupled between each subsystem 802a and 802b and up-conversion circuitry 836. For example, subsystem dividing circuitry 834 may be configured to split RF transmit signals among subsystems 802a and 802b after up-converting from an IF band using LO signal 738, although conversion from baseband is also possible within the scope of the present aspects. Moreover, while inductive I/Q modulators are shown for subsystems 802a and 802b, it should be appreciated that oscillator-based I/Q modulators may be used. For instance, in such embodiments, subsystem dividing circuitry may be configured to divide up-converted outputs from the oscillator-based I/Q modulators, and prior up-conversion may be omitted.

FIG. 9 is a circuit diagram of an example RF transceiver system 900 including upstream, inductive transmitter I/Q modulation circuitry and downstream, inductive receiver I/Q modulation circuitry, according to some embodiments. In some embodiments, system 900 may include a transmit subsystem 902a and a receive subsystem 902b. For example, transmit subsystem 902a may be configured in the manner described herein for system 600 (e.g., including transmit circuit 620 and beamformer 630 including I/Q vector modulation circuitry 640) and/or receive subsystem 902b may be configured in the manner described herein for system 300 (e.g., including receive circuit 320 and beamformer 330 including I/Q vector modulation circuitry 340).

In some embodiments, transmit subsystem 902a and receive subsystem 902b may share an antenna system 910. For example, as shown in FIG. 9, antenna system 910 includes antennas 910a, 910b, 910c, and 910d, and each transmitter of transmit subsystem 902a may be configured to transmit RF signals via respective antennas 910a, 910b, 910c, and 910d, and each receiver of receive subsystem 902b may be configured to receive RF signals via respective antennas 910a, 910b, 910c, and 910d. In the illustrated embodiment, antenna system 910 further includes transmit/ receive (T/R) switches 914a, 914b, 914c, and 914d coupled between antennas 910a, 910b, 910c, and 910d and amplification circuitry of transmit subsystem 902a and receive subsystem 902b such that each antenna 910a, 910b, 910c, and 910d may only be operable to obtain or provide RF signals from or to one subsystem at a given time.

Figure 10:
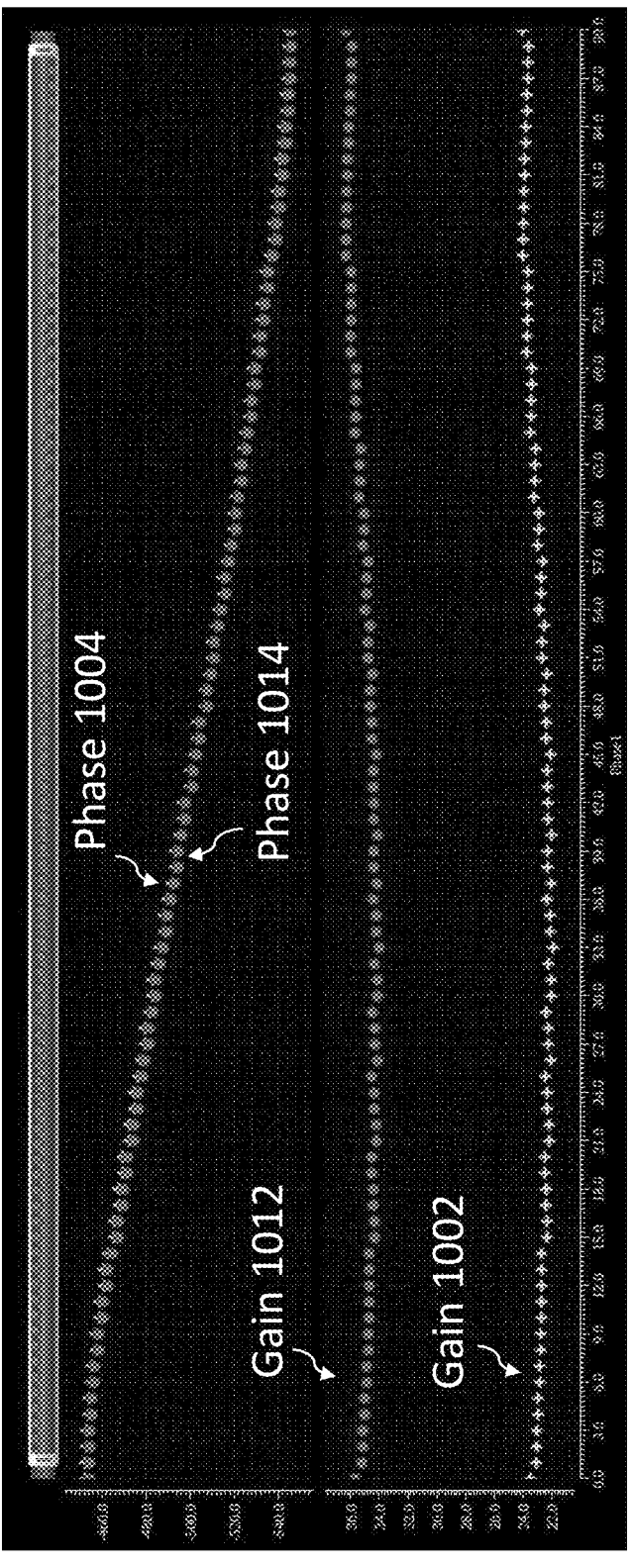
FIG. 10 is a graph of example simulated gain and phase over a range of modulated phases for a system described herein, according to some embodiments.

FIG. 10 is a graph 1000 of example simulated gain and phase over a range of modulated phases for a system described herein, according to some embodiments. As shown in FIG. 10, graph 1000 includes four curves corresponding to two simulations of a system configured as described herein for system 300. In the first simulation, only one channel of the system (e.g., antenna 310a and amplification circuitry 322a) was activated and an RF signal was swept over a range of modulated phases. In the second simulation, all four channels (e.g., antennas 310a, 310b, 310c, and 310d and amplification circuitry 322a, 322b, 322c, and 322d) were activated and RF signals from each channel were swept over a range of modulated phases (e.g., using I/Q vector modulation). The simulations show that I/Q modulation may be performed downstream of channel summation in a receiver system (and/or upstream of channel division in a transmitter system) without compromising gain or phase accuracy.

As shown in graph 1000, a first curve 1002 shows gain of an RF signal received in the activated channel during first simulation and a second curve 1004 shows phase of the first RF signal as the phase was swept over a range of modulated phases from 0 to 90°. As is shown in graph 1000, the gain of the RF signal was substantially constant over the range of modulated phases, and the phase of the RF signal substantially matched the modulated phase.

Also shown in graph 1000, a third curve 1012 shows gain of an RF signal summed from signals received in all four activated channels during the second simulation and a second curve 1014 shows phase of the RF signal as the phases of each channel were swept over a range of modulated phases from 0 to 90°. As is shown in graph 1000, the gain of the RF signal was substantially constant over the range of modulated phases and higher than the gain of the first simulation due to combining multiple channels, and the phase of the RF signal substantially matched the modulated phase.

Having described several example systems herein, it should be appreciated that other implementations than those shown by way of example are contemplated within the scope of the present aspects.

As one example, according to various embodiments, antenna systems described herein or usable with examples described herein may include various types of antennas, such as dipole antennas, monopole antennas, patch antennas, slot antennas, horn antennas, and/or any other suitable antennas. In some embodiments, antennas of an antenna system may include more than one antenna element. For example, an antenna may include multiple antenna elements configured with respective polarities that are orthogonal to one another. In this example, a transmitter, receiver, and/or transceiver as described herein may be configured to operate each of the polarities of the antenna element, and/or multiple transmitters, receivers, and/or transceivers as described herein may be coupled to the antenna to operate the respective polarities. Alternatively or additionally, an antenna may include multiple radiating elements with respective feeds, and a single transmitter, receiver, and/or transceiver or multiple transmitters, receivers, and/or transceivers as described herein may be coupled to the feeds of the antenna for using the respective radiating elements.

As one example, while analog circuit implementations have been described herein for beamforming circuitry and phase shift circuitry, it should be appreciated that digital beamforming and/or phase shift circuitry may be included in some implementations where appropriate.

In some embodiments, aspects described herein may embodied in a device, such as a communications device including a system described herein, and/or a device within a system described herein. In some embodiments, aspects described herein may be embodied in a method, such as a method of operating a system described herein and/or a method performed using a system described herein.

Various aspects of the systems described herein may be used alone, in combination, or in a variety of arrangements not specifically discussed in the embodiments described in the foregoing description and is therefore not limited in its application to the details and arrangement of components set forth in the foregoing description or illustrated in the drawings. For example, aspects described in one embodiment may be combined in any manner with aspects described in other embodiments.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including", "comprising", "having", "containing" or "involving" and variations thereof herein, is meant to encompass the items listed thereafter and equivalents thereof as well as additional items.

The use of "coupled" or "connected" is meant to refer to circuit elements, or signals, that are either directly linked to one another or through intermediate components. Elements that are not "coupled" or "connected" are "decoupled" or "disconnected."

The use of "between" in a coupled signal chain is not meant to require a particular direction of signal flow in the signal chain unless stated otherwise. For instance, where element B is described as coupled between elements A and C in a signal chain, signals may flow from element A to element C through element B and/or from element C to element A through element B unless stated otherwise.

As used herein, a receiver and/or transmitter may be "configured for communication via an antenna," even if the receiver and/or transmitter is/are not yet physically connected to the antenna (e.g., prior to manufacture of the complete system), if the transmitter and/or receiver is/are at least capable of transmitting and/or receiving signals in least at a subset of the operating frequency range of the antenna.

The terms "approximately", "substantially," and "about" may be used to mean within ±20% of a target value in some embodiments, within ±10% of a target value in some embodiments, within ±5% of a target value in some embodiments, and within ±2% of a target value in some embodiments. The terms "approximately" and "about" may include the target value.

What is claimed is:

1. A radio-frequency (RF) beamforming circuit, comprising:
  amplification circuitry configured to transmit and/or receive RF signals via a plurality of RF antennas;
  in-phase and quadrature (I/Q) vector modulation circuitry; and
  channel summing and/or dividing circuitry coupled between the amplification circuitry and at least a portion of the I/Q vector modulation circuitry;

wherein the amplification circuitry comprises, for each of the plurality of RF antennas, an amplifier configured to transmit and/or receive an RF signal via the respective RF antenna, each amplifier being associated with a channel that the channel summing and/or dividing circuitry is configured to sum and/or divide;

wherein the channel summing and/or dividing circuitry comprises a first summing and/or dividing circuit coupled between each amplifier of the amplification circuitry and an in-phase port of the I/Q vector modulation circuitry and a second summing and/or dividing circuit coupled between each amplifier of the amplification circuitry and a quadrature port of the I/Q vector modulation circuitry.

2. The RF beamforming circuit of claim 1, wherein the I/Q vector modulation circuitry comprises:

an I/Q modulator comprising the in-phase port and the quadrature port;

a first plurality of amplitude adjusters coupled between respective amplifiers and the first summing and/or dividing circuit; and a second plurality of amplitude adjusters coupled between the respective amplifiers and the second summing and/or dividing circuit.

3. The RF beamforming circuit of claim 1, wherein the I/Q vector modulation circuitry comprises inductive I/Q vector modulation circuitry.

4. The RF beamforming circuit of claim 1, wherein:

the amplification circuitry is configured to transmit RF signals via the plurality of RF antennas; and the channel summing and/or dividing circuitry comprises channel dividing circuitry coupled between input ports of the amplification circuitry and output ports of the I/Q vector modulation circuitry.

5. The RF beamforming circuit of claim 4, wherein the channel dividing circuitry comprises:

a first channel divider coupled between the input ports of the amplification circuitry and an in-phase output port of the I/Q vector modulation circuitry; and a second channel divider coupled between the input ports of the amplification circuitry and a quadrature output port of the I/Q vector modulation circuitry.

6. The RF beamforming circuit of claim 5, further comprising, for each of the plurality of RF antennas, a combiner having a first input port coupled to an output port of the first channel divider, a second input port coupled to an output port of the second channel divider, and an output port coupled to the RF antenna.

7. The RF beamforming circuit of claim 1, wherein:

the amplification circuitry is configured to receive RF signals via the plurality of RF antennas; and the channel summing and/or dividing circuitry comprises channel summing circuitry coupled between output ports of the amplification circuitry and input ports of an I/Q vector demodulation circuitry.

8. The RF beamforming circuit of claim 7, wherein the channel summing circuitry comprises:

a first channel summer coupled between the output ports of the amplification circuitry and an in-phase input port of the I/Q vector demodulation circuitry; and a second channel summer coupled between the output ports of the amplification circuitry and a quadrature input port of the I/Q vector demodulation circuitry.

9. The RF beamforming circuit of claim 8, further comprising, for each of the plurality of RF antennas, a splitter having an input port coupled to the RF antenna, a first output port coupled to an input port of the first channel summer, and a second output port coupled to an input port of the second channel summer.

10. A radio-frequency (RF) transmit and/or receive system, comprising:

a plurality of transmitters and/or receivers configured to communicate via a respective plurality of RF antennas; and beamforming circuitry configured to transition between an RF signal and a plurality of RF signals at the plurality of RF antennas, respectively, the plurality of RF signals being steered with respect to the RF signal, and the beamforming circuitry comprising:

an in-phase and quadrature (I/Q) modulator configured to process a first component of the RF signal as an in-phase component and a second component of the RF signal as a quadrature component; and circuitry configured to convert between the first component of the RF signal and first components of the plurality of RF signals and between the second component of the RF signal and second components of the plurality of RF signals.

11. The RF transmit and/or receive system of claim 10, wherein each of the plurality of transmitters and/or receivers comprises an amplifier coupled to a respective one of the plurality of antennas.

12. The RF transmit and/or receive system of claim 10, wherein the I/Q modulator comprises an inductive I/Q modulator.

13. The RF transmit and/or receive system of claim 10, wherein the I/Q modulator comprises an in-phase frequency converter configured to process the first component of the RF signal and a quadrature frequency converter configured to process the second component of the RF signal.

14. The RF transmit and/or receive system of claim 10, wherein the first components of the plurality of RF signals correspond to in-phase components of the plurality of RF signals and the second components of the plurality of RF signals correspond to quadrature components of the plurality of RF signals.

15. The RF transmit and/or receive system of claim 10, wherein the beamforming circuitry further comprises vector modulation circuitry configured to individually adjust amplitudes of the first components of the plurality of RF signals and to individually adjust amplitudes of the second components of the plurality of RF signals.

16. The RF transmit and/or receive system of claim 10, wherein:

the plurality of transmitters and/or receivers comprises a plurality of transmitters configured to transmit the plurality of RF signals via the plurality of RF antennas; and the circuitry comprises a first divider circuit configured to split the first component of the RF signal into the first components of the plurality of RF signals and a second divider circuit configured to split the second component of the RF signal into the second components of the plurality of RF signals.

17. The RF transmit and/or receive system of claim 16, wherein the beamforming circuitry further comprises, for each of the plurality of RF signals, a combiner circuit configured to combine the first and second components of the respective RF signal for transmission via a respective one of the plurality of RF antennas.

18. The RF transmit and/or receive system of claim 10, wherein:

the plurality of transmitters and/or receivers comprises a plurality of receivers configured to obtain the plurality of RF signals via the plurality of RF antennas;

the circuitry comprises a first summing circuit configured to combine the first components of the plurality of RF signals into the first component of the RF signal and a second summing circuit configured to combine the second components of the plurality of RF signals into the second component of the RF signal; and the beamforming circuitry further comprises, for each of the plurality of RF signals, a splitter circuit configured to obtain and provide the first and second components of the respective RF signal when received via a respective one of the plurality of RF antennas.

* * * * *